Figure 1:
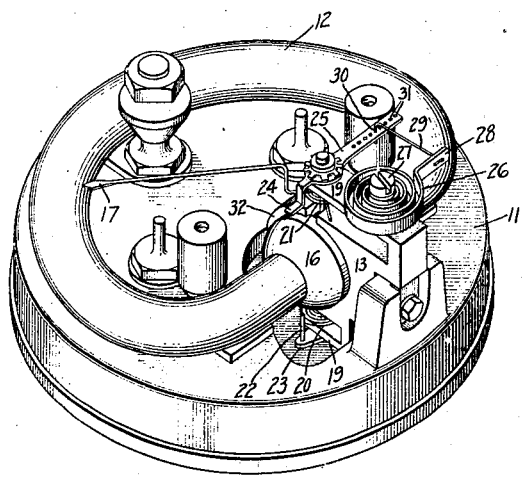

Oct. 8, 1935.  H. T. FAUS  2,016,894

TEMPERATURE COMPENSATION DEVICE

Filed Oct. 22, 1932

Inventor:
Harold T. Faus,
by Charles E. Tullar
His Attorney.

Patented Oct. 8, 1935

2,016,894

UNITED STATES PATENT OFFICE 2,016,894

TEMPERATURE COMPENSATION DEVICE

Harold T. Faus, Lynn, Mass., assignor to General Electric Company, a corporation of New York Application October 22, 1932, Serial No. 639,134

8 Claims. (Cl. 73—32)

My invention relates to temperature compensation devices and concerns particularly arrangements for the temperature compensation of measuring instruments.

It is an object of my invention to provide a simple, reliable, easily adjusted compensating device. Another object of my invention is to produce an arrangement in which an adjustable degree of compensation is provided. Still another object is to provide an arrangement by means of which a correction of fixed magnitude for a given ambient temperature may, if desired, be obtained at all scale positions of a measuring instrument. A further object is to provide a measuring instrument in which the zero position is varied in response to variations in temperature and in which the amount of variation in zero position may be adjusted. It is also an object of my invention to provide a compensated current-responsive instrument for use with thermocouples for temperature measurements in which the compensation of the instrument corrects for variations in the temperature of the cold junction of the thermocouples. Other and further objects will become apparent as the description proceeds.

It is well known that measuring instruments of various types are subject to errors or changes in calibration resulting from variations in the ambient temperature to which they are subjected. In electrical instruments, for example, errors roughly proportional to the scale readings or to the deflections may be introduced as the result of variations in resistance of the windings with variations in temperature. In certain classes of instruments fixed errors may also be introduced as a result of variations in temperature from a normal temperature at which the device is calibrated. For example, in the case of thermocouple pyrometers, errors are introduced as a result of the variations in ambient temperature which affect the temperature of the cold junction. Since the net electromotive force of a pair of thermocouples connected in opposition depends upon the difference in temperature of the two thermocouples, a variation in temperature of the cold junction from the temperature at which the device is calibrated tends to introduce an error in the indications which is substantially fixed for any given temperature of the cold junction. Obviously, variations in resistance in the windings of the current-responsive instrument used with thermocouples will introduce an additional error in the indications which varies approximately in proportion to the scale readings for any given ambient temperature.

My invention contemplates a device in which errors of both types may be overcome, but does not include specifically arrangements for correcting errors of the latter type.

In accordance with my invention in its preferred form I employ a measuring instrument of any suitable type having a movable element with adjustable means for biasing the movable element to a given position referred to as the zero position. In order to vary the zero position in response to variations in temperature or in order to correct for fixed errors resulting from temperature variations, I provide a temperature-responsive deflecting device such as a coiled bimetallic strip, for example, which is mechanically connected to the zero biasing means. The connection between the deflecting means and the biasing means is made adjustable in order that the degree of compensation obtained may be adjusted. Suitable means such as a magnetic shunt of temperature-responsive magnetic material, for example, is employed to correct for temperature errors in the instrument which tend to increase in proportion to the deflection or the scale reading of the instrument. The features of my invention which I believe to be novel and patentable will be pointed out in the claims appended hereto.

Figure 2:
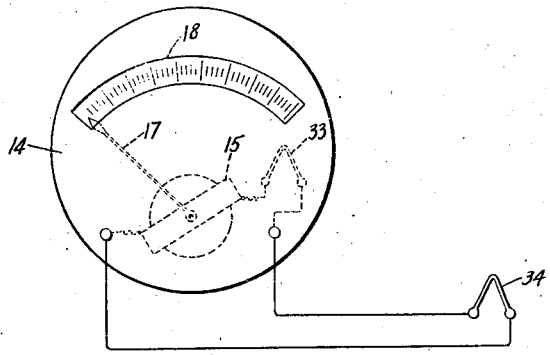

For a better understanding of my invention, reference may be had to the following description taken in connection with the accompanying drawing in which Fig. 1 represents in perspective a compensated measuring instrument having the cover and certain other portions removed in order to expose the interior of the instrument, and Fig. 2 represents schematically the connections of a compensated thermocouple type of temperature indicator.

Referring now more in detail to the drawing in which like parts are referred to by like reference characters throughout, I have illustrated the manner of carrying out my invention in connection with a deflecting electrical instrument for use with a thermocouple pyrometer, but it will be understood that my invention is not limited to such instruments but may be employed in connection with apparatus of any type in which a similar form of temperature compensation is desired.

The instrument illustrated in Fig. 1 comprises a base plate 11 supporting a permanent magnet 12 and a suitably shaped bracket 13 for supporting the movable element of the instrument. The base 11, together with a cover 14 indicated schematically in Fig. 2, but not shown in Fig. 1 forms a casing enclosing the instrument.

The movable element comprises a deflecting coil 15 indicated schematically in Fig. 2, which is supported betwen the pole pieces 16, only one of which is visible in the illustration of Fig. 1. The movable element also includes a pointer 17 cooperating with a scale 18 indicated in Fig. 2. The movable element is carried by a vertical shaft (not visible) supported by jewels (also not visible) attached to the arms 19 of the bracket 13. Suitable hair springs 20 and 21 are provided for biasing the movable element to a given position which may be called the zero position. Each of the hair springs has one of its ends attached to the shaft of the moving element and the other ends are attached respectively to the pin 22 carried by arm 23 and the lug 24 forming a part of the pivoted arm 25. The arm 23 may also, if desired, be pivotally mounted and may, if desired, be arranged so as to move with the pivoted arm 25. However, it is obviously unnecessary that both biasing springs be adjustable in position in order to vary the zero position of the movable element, and the invention will be described merely with reference to the means for varying the angular position of the arm 25.

In order to vary the position of the zero regulator arm 25 in response to variations in temperature, thereby changing the zero position of the instrument or applying a fixed correction to the angular indication of the pointer 17 for a given variation in ambient temperature, I provide a suitable means movable in response to temperature such as, for example, a coiled bimetallic strip 26 adjustably fastened to a portion of the supporting bracket 13 by means of a machine screw 27 and fastened to or including a deflecting arm 28. The deflecting arm 28 and the pivoted arm 25 controlling the zero biasing spring 21 are adjustably connected in any suitable manner such as by means of a link 29 having a lug or transverse portion 30 arranged to be inserted in any one of several holes 31 in arm 25 spaced at varying distances from the point about which arm 25 is pivoted. By changing the point of connection of link 29 to arm 25 from one hole to another, the ratio between the deflections of arms 28 and 25 may be varied and the degree of zero error compensation afforded may be adjusted. Although compensating arrangements are known in which a zero regulator is attached to a thermostatic strip, my arrangement is a considerable improvement in that it is adjustable and in that it is i ot only adjustable, but the adjustment may be varied quickly and easily.

Temperature errors of the type which tend to be proportional to the scale reading of the instrument may be compensated for in any desired manner, for example, by providing a strip of magnetic material 32, the reluctance of which varies with temperature, partially shunting the air gap between the pole pieces 16 of the permanent magnet 12. However, this feature in itself does not form a part of the present invention.

In using zero compensated instruments constructed in accordance with my invention with thermocouple pyrometers, as illustrated in Fig. 2, the cold junction 33 of the pyrometer is mounted within the casing of the instrument so that the reacting elements of the instrument, the thermo-junction 33, and the thermostatic regulator 26 are at substantially the same temperature. A thermo-junction 34 which is preferably connected in opposition to the cold junction 33 is placed at the point the temperature measurement of which is desired. The cold junction error or the variations in readings which ordinarily result when the cold junction of a thermocouple is not maintained at a constant temperature, is overcome by reason of the automatic adjustment in response to temperature by means of the temperature regulator 26 of the position to which the instrument pointer is biased. Consequently, it is unnecessary to provide means for maintaining the cold junction 33 and the indicating instrument at a constant temperature or to provide correction tables for the readings and to measure independently by auxiliary temperature indicating means the actual temperature of the junction 33. Although the junction 33 is referred to as the cold junction, it will be understood that the apparatus is equally applicable to making measurements in which the junction 34 will actually be subjected to temperatures below that of the ambient temperature to which junction 33 is subjected.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a measuring instrument having a movable element and means biasing said element to a zero position, means for varying said zero position to compensate said instrument for temperature variations, comprising a pivoted arm mechanically attached to said zero biasing means, means changing in position in response to variations in temperature, and a link connecting said latter means to said arm, said arm and said link being so arranged that the point of attachment therebetween may be varied for the purpose of varying the distance between the point of attachment and the pivotal axis of said arm in order to adjust the degree of compensation provided by said temperature-responsive means.

2. A measuring instrument comprising a compensating member movable in response to variations in ambient temperature serving to compensate the instrument for fixed errors produced by given variations in ambient temperature, a movable regulating member and a movable indicator member, means for varying the position of the indicator member with respect to the regulating member in response to variations in a quantity being measured, and a mechanical linkage of adjustable ratio connecting said compensating member and said regulating member, thereby permitting the degree of compensation to be adjusted.

3. A measuring instrument comprising a compensating member movable in response to variations in ambient temperature serving to compensate the instrument for fixed errors produced by given variations in ambient temperature, a pivoted member and a movable indicator member, means for varying the position of said indicator member with respect to said pivoted member in response to variations in a quantity being measured, and a mechanical linkage of adjustable ratio comprising a link connecting said compensating member to said pivoted member at a point which may be varied in distance from the point at which said member pivots, thereby permitting the degree of compensation to be adjusted.

4. In a measuring instrument having a movable element and means for biasing said element to a zero position, means for altering said zero position to compensate for variations in ambient temperature, comprising a pivoted arm mechanically attached to said zero biasing means, a thermostatic strip deflecting in response to variations in temperature and adjustable means connecting said thermostatic strip and said arm, whereby the motion imparted to said arm in response to a given deflection of said thermostatic strip may be varied for the purpose of varying the degree of compensation.

5. In a measuring instrument having a movable element and means for biasing said element to a zero position, means for varying said zero position to compensate for variations in ambient temperature comprising a pivoted arm mechanically attached to said zero biasing means, a thermostatic strip having a portion which deflects in response to variations in temperature, and a link connecting said deflecting portion and said arm, the point of attachment between said link and said arm being adjustable to permit varying the distance between the point of attachment and the point about which said arm pivots, thereby permitting an adjustment in the amount of motion imparted to said arm by a given deflection of said thermostatic strip for the purpose of varying the degree of temperature compensation provided for said instrument.

6. In combination with a measuring instrument having a movable element and means for biasing said element to a zero position, means for varying said zero position to compensate for variations in ambient temperature comprising a pivoted arm mechanically connected to said zero biasing means, an arm varying in angular position with variations in temperature, and a link connecting said arms having its point of attachment to one of said arms adjustable to permit varying the relationship between the motion of said arms for the purpose of adjusting the degree of compensation of said instrument.

7. A measuring instrument comprising a movable element, means for subjecting said movable element to a force varying in accordance with the magnitude of the quantity to be measured, a spring connected at one end to said element and serving to bias said element to a zero position, a member supporting said biasing spring at its other end, a temperature-responsive deflecting element connected to and arranged to vary the position of said supporting member in response to variations in temperature, and means for varying the ratio between the changes in position of said supporting member and said temperature-responsive element to permit varying the degree of compensation provided.

8. A temperature indicating device comprising a pair of thermocouples connected in opposition and an electrical instrument connected in series therewith, one of said thermocouples being placed at the point at which a temperature measurement is to be taken, said instrument having a casing within which the other of said thermocouples is mounted, thereby causing said instrument and said second thermocouple to be at substantially the same temperature, said instrument comprising a movable element, means for biasing said movable element to a zero position, means for varying said zero position to compensate for variations in the temperature of said second thermocouple, comprising a pivoted member attached to said zero biasing means, a second member changing in angular position in response to variations in temperature, and adjustable means connecting said members permitting a variation in the relationship between the motions of said pivoted member and said thermo-responsive member, thereby permitting the degree of compensation for variations in temperature of the second thermocouple to be varied.

HAROLD T. FAUS.